US011185085B2

(12) United States Patent
Anton et al.

(10) Patent No.: US 11,185,085 B2
(45) Date of Patent: Nov. 30, 2021

(54) PROCESS FOR PREPARING A PARTICULATE DAIRY COMPOSITION AND A PARTICULATE DAIRY COMPOSITION SO OBTAINED

(71) Applicant: FrieslandCampina Nederland B.V., Amersfoort (NL)

(72) Inventors: Ivan Anton Anton, Wageningen (NL); Anders Erik Ingmar Lindqvist, Wageningen (NL); Paul Bastiaan Van Seeventer, Wageningen (NL)

(73) Assignee: FrieslandCampina Nederland B.V., Amersfoort (NL)

( * ) Notice: Subject to any disclaimer, the term of this patent is extended or adjusted under 35 U.S.C. 154(b) by 187 days.

(21) Appl. No.: 16/349,900

(22) PCT Filed: Nov. 13, 2017

(86) PCT No.: PCT/EP2017/079052
§ 371 (c)(1),
(2) Date: May 14, 2019

(87) PCT Pub. No.: WO2018/091409
PCT Pub. Date: May 24, 2018

(65) Prior Publication Data
US 2020/0060302 A1 Feb. 27, 2020

(30) Foreign Application Priority Data
Nov. 15, 2016 (EP) .................................... 16198976

(51) Int. Cl.
A23C 9/16 (2006.01)
A23C 9/13 (2006.01)
A23F 5/14 (2006.01)

(52) U.S. Cl.
CPC .............. A23C 9/16 (2013.01); A23C 9/1307 (2013.01); A23F 5/14 (2013.01); A23C 2210/40 (2013.01)

(58) Field of Classification Search
CPC ..... A23C 9/16; A23C 9/1307; A23C 2210/40; A23F 5/14
USPC ........................................................ 426/588
See application file for complete search history.

(56) References Cited

U.S. PATENT DOCUMENTS

| 3,251,291 | A |   | 5/1966  | Thompson et al.           |
|-----------|----|---|---------|---------------------------|
| 3,410,701 | A |   | 11/1968 | Ciboit                    |
| 6,026,732 | A |   | 2/2000  | Kollep et al.             |
| 2003/0096038 | A1 |   | 5/2003  | Cai                    |
| 2005/0008752 | A1 | * | 1/2005  | Charman ......... A23C 9/15 426/590 |
| 2011/0070335 | A1 |   | 3/2011  | Brugger                |
| 2014/0141128 | A1 |   | 5/2014  | Trombetta et al.       |
| 2016/0068336 | A1 |   | 3/2016  | Biesheuvel et al.      |

FOREIGN PATENT DOCUMENTS

| AU | 520639 B2 | 2/1982 |   |
|----|-----------|--------|---|
| EP | 1 074 181 A1 | 2/2001 |   |
| EP | 2 123 164 A1 | 11/2009 |   |
| EP | 2123164 A1 * | 11/2009 | ............. A23P 10/30 |
| GB | 2 381 731 A | 5/2003 |   |
| GB | 2 523 380 A | 8/2015 |   |
| GB | 2 525 921 A | 11/2015 |   |
| WO | WO-2006/043102 A1 | 4/2006 |   |
| WO | WO-2011/039027 A1 | 4/2011 |   |
| WO | WO-2016/008742 A1 | 1/2016 |   |
| WO | WO-2016/014562 | 1/2016 |   |
| WO | WO-2016008742 A1 * | 1/2016 | ............. A23C 11/04 |

OTHER PUBLICATIONS

International Search Report and Written Opinion issued in International Application No. PCT/EP2017/079052, dated Dec. 13, 2017.

* cited by examiner

Primary Examiner — Brent T O'Hern
(74) Attorney, Agent, or Firm — Foley & Lardner LLP; Sanit Talapatra

(57) ABSTRACT

A process for preparing a particulate dairy composition is provided, which comprises (a) combining condensed skimmed milk, sucrose, milk cream and milk powder to prepare a pre-emulsion containing 46-66 wt. % dry matter; (b) homogenizing the pre-emulsion; (c) spray drying the emulsion to produce a semi-dried powder having a water content of at least 5 wt. % water; and (d) agglomerating and further drying the semi-dried powder to produce agglomerates having a water content of less than 5 wt. % water. The process yields a particulate dairy composition that is particularly suitable for use in creamer capsules. Particulate dairy compositions are also disclosed, comprising (A) 77.5-100 wt. % of agglomerates containing, calculated by dry weight of the agglomerates: (i) 15-29 wt. % of milk protein; (ii) 8-33 wt. % of milk fat; (iii) 18-47 wt. % of lactose; and (iv) 7-18 wt. % of sucrose; and (B) 0-22.5 wt. % of sucrose particles, wherein the composition has a poured bulk density of 380-550 g/l.

7 Claims, No Drawings

PROCESS FOR PREPARING A PARTICULATE DAIRY COMPOSITION AND A PARTICULATE DAIRY COMPOSITION SO OBTAINED

CROSS-REFERENCE TO RELATED APPLICATIONS

This application is the National Phase of International Patent Application No. PCT/EP2017/079052, filed Nov. 13, 2017, published on May 24, 2018 as WO 2018/091409 A1, which claims priority to European Patent Application No. 16198976.9, filed Nov. 15, 2016. The contents of these applications are herein incorporated by reference in their entirety.

TECHNICAL FIELD OF THE INVENTION

The invention relates to a process for preparing a particulate dairy composition. More particularly, the invention provides a process for preparing a particulate dairy composition, wherein the process comprises the steps of:
  combining condensed skimmed milk, sucrose, milk cream and milk powder to prepare a pre-emulsion;
  homogenizing the pre-emulsion to obtain an emulsion;
  spray drying the emulsion to produce a semi-dried powder;
  agglomerating and further drying the semi-dried powder to produce agglomerates having a water content of less than 5 wt. % water.

The invention further provides a particulate dairy composition comprising:
  77.5-100 wt. % of agglomerates containing, calculated by dry weight of the agglomerates:
    15-29 wt. % of milk protein;
    8-33 wt. % of milk fat;
    18-47 wt. % of lactose; and
    7-18 wt. % of sucrose;
  0-22.5 wt. % of sucrose particles;
  wherein the composition has a poured bulk density of 380-550 WI.

The particulate dairy composition of the present invention can suitably be used as an instant dairy creamer in capsules for use in coffee brewing machines that utilise injection of water at high temperature and pressure to dissolve the dairy creamer, thereby producing a hot dairy creamer liquid.

BACKGROUND OF THE INVENTION

AU520639 describes a method for manufacturing a reconstitutable spray dried cream powder comprising the steps of:
  (i) forming a mixture of the following ingredients
    a source of milk fat to provide said mixture with a milk fat content of 18 to 40 parts by weight of the mixture,
    a source of non-fat milk solids to provide said mixture with a non-fat milk solids content of 12 to 24 parts by weight of the mixture,
    sugar, 0 to 10 parts by weight of the mixture,
    stabilizer, 0.05 to 1 parts by weight of the mixture,
    water to make the mixture up to 100 parts by weight;
  (ii) pasteurizing the mixture;
  (iii) homogenizing the mixture; and
  (iv) spray-drying the mixture to produce a cream powder.
The obtained cream powder, when reconstituted, can deliver a whipped cream.

U.S. Pat. No. 3,410,701 describes a process for the production of milk-product powders, comprising the steps of providing a starting milk-product concentrate containing a proportion of dry material which is greater than 45% and having a temperature which is greater than 45° C., subjecting the starting milk-product concentrate to a spray-drying process by effecting the drying with drying air in the spray-drier until a powder is obtained having a water content within the range of 4.5 to 7%, and separating the powder from the drying air and then subjecting the powder thus obtained and having a water content within the range of 4.5 to 7% directly to a different secondary drying process for a period of time so as to reduce its water content to approximately 3.5%.

WO 2016/008742 describes a spray-dried creamer composition comprising:
  added sugar comprising sucrose and/or lactose ranging from 5-30% by weight;
  milk ranging from 30-60% by weight;
  fat ranging from 15-40% by weight;
wherein said composition does not flocculate upon reconstitution in coffee or tea at temperature of water ranging from 40-90° C. and hardness up to 400 ppm $CaCO_3$.

EP-A 2 123 164 describes a granulated dairy product comprising dry emulsified fat particles that are agglomerated together and at least partially coated with a first binding medium comprising a carbohydrate, so as to form coated agglomerate granules of mean particle diameter between 10 μm and 10000 μm, GB-A 2 381 731 describes a powdered beverage whitener composition comprising, by weight based the dry weight of the composition: from about 50% to about 80% of a milk powder; from about 5% to about 30% of whey solids, and from about 10% to about 30% of one or more added sugars.

Creamers are commonly prepared in the art by spray-drying an emulsion of protein, fat and carbohydrates. These creamers can be dairy or non-dairy based, and can be readily applied for whitening beverages. In most beverage applications, there are no special requirements for the dissolution properties of creamers, since the creamers are dissolved in a large volume of hot or cold beverage, and mostly the beverage is stirred for some time to dissolve the creamer.

In some beverage applications however, the dissolution of creamers is too slow and incomplete, and in order to improve their dissolution the powders are agglomerated. E.g. skimmed milk powder can be instantized by hot humid air agglomeration. However, when such agglomerated skimmed milk powder is applied as a creamer, this creamer is insufficient in whitening power and taste, because the fat content in the creamer is too low. These types of agglomerated skimmed milk particles typically have a very low bulk density.

Whole milk powder does contain sufficient amounts of fat to provide sufficient whitening power and taste. Whole milk powder is however difficult to instantize by agglomeration, because of the low melting temperature of milk fat, which causes technical problems in agglomerators.

Spray-dried whole milk particles are usually agglomerated by spraying soy lecithin in oil onto the spray dried particles to glue the particles together. Thereafter, the glued particles can be blended e.g. with sucrose. These types of agglomerated whole milk particles are generally low in solubility and/or do not dissolve fast enough in a relative short time; moreover they have a very sweet taste and an off-taste caused by the lecithin.

U.S. Pat. No. 6,026,732 describes capsules containing a substance to be extracted for preparation of a drink, wherein the capsules comprise a cup, a cover and a lip and wherein the cup sidewall extends to the cover and lip. These capsules can be used to prepare drinks in a device that is configured for containing a capsule during extraction and that comprises a member for injecting water into the capsule for extraction of the substance in the capsule under pressure. The capsules described in U.S. Pat. No. 6,026,732 are especially designed to hold roasted, ground coffee.

Capsules comprising instant dairy creamers for use in high pressure coffee brewing machines are available on the market. A technical challenge associated with the use of instant creamer capsules in coffee brewing machines arises from the fact that such machines are designed for quick extraction of taste components from ground coffee in coffee capsules, and are not built for quick complete dissolution of instant creamers.

The instant dairy creamers in such capsules should not only be capable of readily dissolving when hot pressurised water is injected in the capsule during normal operation of these coffee brewing machines, but should at the same time provide a full-bodied creamy and/or milky liquid of excellent quality, i.e. comprising substantial amounts of milk protein and milk fat in the obtained hot creamy and/or milky liquid.

There is thus a need for an instant dairy creamer powder that has sufficient bulk density and a high solubility, which is suitable for being dispensed from a capsule for use in a coffee brewing machine, without the need to compromise on the full-bodied taste of the resulting dispensed liquid from the capsule.

SUMMARY OF THE INVENTION

The inventors have developed a process for preparing a particulate dairy composition. This process allows for the preparation of a particulate dairy creamer comprising relatively high levels of milk protein and milk fat.

Accordingly, a first aspect of the invention relates to a process for preparing a particulate dairy composition, wherein the process comprises the steps of:
  combining condensed skimmed milk, sucrose, milk cream and milk powder to prepare a pre-emulsion containing 46-66 wt. % dry matter, including by weight of dry matter:
    15-29 wt. % of milk protein;
    8-33 wt. % of milk fat;
    18-47 wt. % of lactose; and
    7-18 wt. % of sucrose;
  homogenizing the pre-emulsion in a homogenization step at a temperature between 55-70° C. and at a pressure between 5-120 bar to obtain an emulsion;
  spray drying the emulsion to produce a semi-dried powder having a water content of at least 5 wt. % water;
  agglomerating and further drying the semi-dried powder to produce agglomerates having a water content of less than 5 wt. % water.

Without wishing to be bound by theory, the inventors believe that the present process leads to the preparation of particulate dairy composition with excellent properties due to the combination of the processing steps and the properties of the pre-emulsion that is applied in the present process.

The particulate dairy composition obtained by the present process offers the advantage that it combines a relatively high bulk density with high levels of protein and fat and excellent dissolution properties.

Due to these properties the particulate dairy composition of the invention is particularly suitable for use in creamer capsules. The prepared particulate dairy composition with its high bulk density can suitably fill such capsules, having a limited internal volume, with a relatively high weight of ingredients, while allowing the complete dissolution of all ingredients in the capsule, when used in a coffee brewing machine which applies injection of hot pressurized water during normal operation.

The dispensed creamy and/or milky liquid is high in protein and fat and has excellent foaming properties, mouthfeel, whitening powder and taste.

A second aspect of the inventions therefor pertains to a particulate dairy composition, wherein the composition comprises:
  77.5-100 wt. % of agglomerates containing, calculated by dry weight of the agglomerates:
    15-29 wt. % of milk protein;
    8-33 wt. % of milk fat;
    18-47 wt. % of lactose; and
    7-18 wt. % of sucrose;
  0-22.5 wt. % of sucrose particles;
wherein the composition has a poured bulk density of 380-550 WI.

The invention further pertains to a sealed capsule comprising the particulate dairy composition of the invention. The particulate dairy composition is able to be rapidly dissolved and completely removed from the capsule when used in a coffee brewing machine using hot pressurized water.

The invention also relates to the use of the sealed capsule for preparing a beverage in a high pressure coffee brewing machine.

DETAILED DESCRIPTION OF THE INVENTION

A first aspect of the present invention relates to a process for preparing a particulate dairy composition, wherein the process comprises the steps of:
  combining condensed skimmed milk, sucrose, milk cream and milk powder to prepare a pre-emulsion containing 46-66 wt. % dry matter, including by weight of dry matter:
    15-29 wt. % of milk protein;
    8-33 wt. % of milk fat;
    18-47 wt. % of lactose; and
    7-18 wt. % of sucrose;
  homogenizing the pre-emulsion in a homogenization step at a temperature between 55-70° C. and at a pressure between 5-120 bar to obtain an emulsion;
  spray drying the emulsion to produce a semi-dried powder having a water content of at least 5 wt. % water;
  agglomerating and further drying the semi-dried powder to produce agglomerates having a water content of less than 5 wt. % water.

The term "fat" as used herein refers to lipids selected from the group of triglycerides, diglycerides, monoglycerides, phosphatides, fatty acids, I and combinations thereof.

The term "milk protein" as used herein refers to proteins that are naturally present in bovine milk. Caseins and whey proteins (e.g., beta-lactoglobulin and alpha-lactalbumin) are examples of milk protein.

The unit "Sauter mean diameter" (D[3,2]) as used herein can be determined using a Malvern Mastersizer 2000.

The unit "volume weighted average particle size" (D[4,3]) as used herein can be determined using a Malvern Mastersizer 2000.

The units $d_{10}$, $d_{50}$ and $d_{90}$, as used herein can be determined by using laser light scattering to measure the particle size distribution. A suitable machine for performing such measurements is the Malvern Mastersizer 2000. The $d_{50}$, the median, is defined as the diameter where half of the population lies below this value. Similarly, 90 percent of the distribution lies below the $d_{90}$, and 10 percent of the population lies below the $d_{10}$.

The unit "poured bulk density" as used herein can be determined by measuring the weight that 500 ml of a particulate dairy composition weighs, directly after pouring the particulate dairy composition into a 500 ml calibrated stationary cylinder [Seedburo Equipment Co] having a length of 9.2 cm and a diameter of 7.7 cm. The poured bulk density is thus measured without tapping the particulate dairy composition after pouring the particulate dairy composition into the cylinder.

Preferably the pre-emulsion of the present invention contains 48-64 wt. % of dry matter, more preferably the pre-emulsion contains 52-63 wt. % of dry matter an most preferably the pre-emulsion contains 55-62 wt. % of dry matter.

Preferably, the dry matter of the pre-emulsion comprises by weight of dry matter:
  18-26 wt. % of milk protein;
  15-30 wt. % of milk fat;
  25-42 wt. % of lactose; and
  8-17 wt. % of sucrose.

More preferably, the dry matter of the pre-emulsion comprises by weight of dry matter:
  22-24 wt. % of milk protein;
  20-25 wt. % of milk fat;
  33-37 wt. % of lactose; and
  9-16 wt. % of sucrose.

The condensed skimmed milk of the present invention preferably has a dry matter content of 25-45 wt. % and a fat content of 0.5-1.5% by weight of dry matter.

The milk cream of the present invention preferably has a dry matter content of 40-60 wt. % and a fat content of 87-90% by weight of dry matter.

The milk powder of the present invention preferably has a dry matter content of 90-100 wt. % and a fat content of 0.5-30% by weight of dry matter. More preferably, the milk powder is skimmed milk powder.

Accordingly, the skimmed milk powder preferably has a dry matter content of 90-100 wt. % and a fat content of 0.5-2.5% by weight of dry matter.

The pre-emulsion is preferably prepared by combining:
  a. 7-44 parts by weight of condensed skimmed milk;
  b. 5-15 parts by weight of sucrose;
  c. 10-57 parts by weight of milk powder;
  d. 10-40 parts by weight of milk cream.

The pre-emulsion is more preferably prepared by combining:
  a. 10-34 parts by weight of condensed skimmed milk;
  b. 7-13 parts by weight of sucrose;
  c. 22-52 parts by weight of milk powder;
  d. 15-35 parts by weight of milk cream.

The pre-emulsion is most preferably prepared by combining:
  a. 14-20 parts by weight of condensed skimmed milk;
  b. 9-11 parts by weight of sucrose;
  c. 38-48 parts by weight of milk powder;
  d. 20-30 parts by weight of milk cream.

The inventors have found that it is particularly advantageous to mix the ingredients of the pre-emulsion in a specific order. By first adding the sucrose to the liquid ingredients before adding the milk powder, a pre-emulsion can be obtained with a higher dry matter content. Accordingly, in a particularly preferred embodiment, the pre-emulsion is prepared by:
  mixing the condensed skimmed milk with the sucrose to obtain a mixture A;
  mixing mixture A with the milk cream to obtain a mixture B;
  mixing mixture B with the milk powder to obtain the pre-emulsion.

The temperature during the homogenizing of the pre-emulsion is preferably between 56-68° C., more preferably between 58-67° C. and most preferably between 60-65° C.

The pressure during the homogenizing of the pre-emulsion is preferably between 6-100 bar, more preferably between 7-60 bar and most preferably between 8-40 bar.

The inventors have found that it is particularly advantageous to perform the spray-drying of the emulsion using a nozzle pressure that is relatively low, as this generates a semi-dried powder that has optimal characteristics for being agglomerated. Accordingly, the spray-drying of the emulsion is preferably performed using a nozzle pressure of 60-120 bar. More preferably the spray-drying of the emulsion is performed using a nozzle pressure of 65-115 bar and most preferably using a nozzle pressure of 70-110 bar.

The semi-dried powder that is produced in the present process preferably has a water content of 5.5-8 wt. % water, more preferably a water content of 6-7.5 wt. % water and most preferably a water content of 6.5-7.0 wt. % of water.

The agglomerates of the present invention preferably have a water content of less than 4.5 wt. % water, more preferably the agglomerates have a water content of less than 4 wt. % water, even more preferably the agglomerates have a water content of less than 3.5 wt. % of water and most preferably the agglomerates have a water content of less than 3 wt. % of water.

The agglomerates of the present invention preferably have a D[3,2] mean diameter in the range of 50-250 µm, more preferably a D[3,2] mean diameter in the range of 90-200 µm and most preferably a D[3,2] mean diameter in the range of 120-180 µm.

The agglomerates of the present invention preferably have a volume weighted average particle size (D[4,3]) in the range of 150-450 µm, more preferably in the range of 200-400 µm, most preferably in the range of 250-350 µm.

The agglomerates of the present invention preferably have a $d_{10}$ between 40-100 µm, more preferably between 40-80 µm and most preferably between 50-60 µm.

The agglomerates of the present invention preferably have a $d_{50}$ between 140-300 µm, more preferably between 150-290 µm and most preferably between 160-280 µm.

The agglomerates of the present invention preferably have a $d_{50}$ between 350-700 µm, more preferably between 380-650 µm and most preferably between 400-600 µm.

The process of the present invention is preferably preformed in a three-stage dryer to produce agglomerated spray dried powders. Preferably in the first stage, the emulsion is spray dried to a semi-dried power in a primary spray chamber. Preferably, in the second stage, the semi-dried powder is deposited onto a moving belt (e.g. woven polyester filament) situated at the bottom of the primary spray chamber. Drying air with a temperature in the range of 70-80° C. is preferably distributed through the belt with a relatively high velocity to obtain agglomerates. This is the second stage of drying (crossflow drying). After an optional short stabilization period in a retention section, the agglomerates are preferably conveyed to the third stage in which drying is completed by exposure to low-temperature air.

An example of such a three-stage dryer is a Filtermat™ spray dryer.

The inventors have found that a particulate dairy composition that produces a hot dairy creamy liquid of excellent quality can be obtained by combining agglomerates containing milk fat, milk protein, lactose and sucrose with sucrose particles. Accordingly, in a preferred embodiment of the invention, the process further comprises the mixing of 77.5-99 parts by weight of the agglomerates with 1-22.5 parts by weight of sucrose particles. More preferably 80-98 parts by weight of the agglomerates are mixed with 2-20 parts by weight of sucrose particles. Most preferably 85-90 parts by weight of the agglomerates are mixed with 10-15 parts by weight of sucrose particles.

The sucrose particles are preferably in the form of crystalline sucrose particles. The sucrose particles in the particulate composition preferably have a $d_{85}$ in the range of 1-500 µm, more preferably in the range of 10-450 µm and most preferably in the range of 50-400 µm. The unit $d_{85}$ can be determined using the DIN 66141 method.

The mixing of the agglomerates and the sucrose particles is preferably performed by means of a screw conveyor, preferably the screw conveyor during the third stage of drying in the three-stage dryer. The screw conveyor provides a mild transport means that leaves the agglomerates intact, but also enables optional mixing with the sucrose particles.

A second aspect of the invention relates to a particulate dairy composition, wherein the composition comprises:
 77.5-100 wt. % of agglomerates containing, calculated by dry weight of the agglomerates:
  15-29 wt. % of milk protein;
  8-33 wt. % of milk fat;
  18-47 wt. % of lactose; and
  7-18 wt. % of sucrose;
 0-22.5 wt. % of sucrose particles;
wherein the composition has a poured bulk density of 380-550 WI.

The particulate dairy composition preferably comprises 77.5-99 wt. % of the agglomerates and 1-22.5 wt. % of sucrose particles. More preferably the particulate dairy composition comprises 80-98 wt. % of the agglomerates and 2-20 wt. % of sucrose particles. Most preferably the particulate dairy composition comprises 85-90 wt. % of the agglomerates and 10-15 wt. % of sucrose particles.

Preferably, the agglomerates contain, calculated by dry weight of the agglomerates:
 18-26 wt. % of milk protein;
 15-30 wt. % of milk fat;
 25-42 wt. % of lactose; and
 8-17 wt. % of sucrose.
More preferably, the agglomerates contain, calculated by dry weight of the agglomerates:
 22-24 wt. % of milk protein;
 20-25 wt. % of milk fat;
 33-37 wt. % of lactose; and
 9-16 wt. % of sucrose.

The poured bulk density of the particulate dairy composition preferably lies in the range of 410-525 g/ml, more preferably in the range of 420-525 g/ml.

The gas tight void volume (GTVV) of the particulate dairy composition is preferably less than 15%, more preferably less than 10% and most preferably less than 8%. The GTVV can be suitable determined using a gas pycnometer (Accupyc1340, Micrometrics Instrument Corporation, Norcross, Ga., USA).

Gas tight void volume is the percentage of gas tight voids within powders. It is calculated from the closed pore volume (%) according to the formula below.

Gas tight void volume (%)
$GTVV = \rho_{Measured} * CPV * 100$

CPV=Closed pore volume (ml/g)

Closed pore volume (ml/g) is obtained by subtracting the theoretical volume from the measured volume for a fixed amount of powder. CPV can also be calculated as follows:

$$CPV = \frac{1}{\rho_{Measured}} - \frac{1}{\rho_{Theoretical}}$$

$\rho_{Measured}$=Measured density of powder (g/ml)
$\rho_{Theoretical}$=Theoretical density of powder (g/ml) (without any closed pore volume)
$\rho_{Measured}$ is determined using a gas pycnometer
$\rho_{Theoretical}$ is estimated using the following assumptions

| Assumptions | |
|---|---|
| ρ moisture (g/ml) | 1 |
| ρ fat (g/ml) | 0.95 |
| ρ protein (g/ml) | 1.3 |
| ρ ash (g/ml) | 2 |
| ρ carbohydrate (g/ml) | 1.55 |

The carbohydrate content of the particulate composition is assumed to be equal to the remainder of the composition after moisture, fat, protein and ash have been accounted for.

The combination of milk fat, milk protein, lactose and sucrose typically constitutes at least 85 wt. %, more preferably at least 90 wt. % of the dry weight contained in the agglomerates.

The agglomerates of the present invention preferably contain 15-30 wt. % of milk fat, more preferably between 20-25 wt. % of milk fat, calculated by dry weight of the agglomerates. Preferably, the milk fat is derived from milk cream.

Milk fat typically constitutes the bulk of the fat contained in the agglomerates of the present invention. Preferably, milk fat constitutes at least 80 wt. %, more preferably at least 90 wt. %, even more preferably at least 95 wt. % of the fat in the agglomerates. Most preferably, all the fat contained in the agglomerates is milk fat.

The agglomerates of the present invention preferably contain no phosphatides other than those naturally present in the milk fat and milk protein components used in the manufacture of the agglomerates.

Accordingly, the agglomerates typically contain 0.05-0.4 wt. % phosphatides, more preferably 0.1-0.33 wt. % phosphatides, calculated by dry weight of the agglomerates.

The agglomerates of the present invention preferably comprise 18-26 wt. % of milk protein, more preferably between 20-24 wt. % of milk protein, calculated by dry weight of the agglomerates.

Milk protein typically constitutes the bulk of the protein contained in the agglomerates. Preferably, milk protein constitutes at least 80 wt. %, more preferably at least 90 wt. %, even more preferably at least 95 wt. % of the protein in the agglomerates. Most preferably, all the protein contained in the agglomerates is milk protein.

Typically, the milk protein contained in the agglomerates contains 77-83% casein by weight of milk protein and 17-23% whey protein by weight of milk protein. More preferably, the agglomerates contain 78-82% casein by weight of milk protein and 18-22% whey protein by weight of milk protein. Together, casein and whey protein typically represent at least 90 wt. %, more preferably at least 95 wt. % of the milk protein that is present in the agglomerates.

The inventors have found that the whitening and/or foaming properties of the particulate dairy composition are dependent on the fat:milk protein ratio in the agglomerates. Very good whitening and/or foaming properties can be achieved if milk fat and milk protein are contained in the agglomerates in a weight ratio that ranges from 1:1.3 to 2.8:1, preferably in a weight ratio that ranges from 1:1.2 to 2:1.

The agglomerates of the present invention preferably comprise 25-42 wt. % of lactose, more preferably 33-37 wt. % of lactose, calculated by dry weight of the agglomerates.

The agglomerates of the present invention preferably comprise 8-17 wt. % of sucrose, more preferably between 9-16 wt. % of sucrose, calculated by dry weight of the agglomerates.

Together, lactose and sucrose typically constitute at least 90 wt. %, more preferably at least 95 wt. % and most preferably at least 99.5 wt. % of the disaccharides contained in the agglomerates.

The particulate dairy composition of the present invention may preferably comprise up to 1.5 wt. % of sodium chloride, calculated by dry weight of the agglomerates. Sodium chloride may suitably be incorporated in the particulate composition for taste enhancement.

The particulate dairy composition of the present invention preferably comprises less than 0.5 wt. %, calculated by dry weight of the agglomerates, of instantizing agents selected from lecithin, polysorbate, ethoxylated mono/diglycerides, propylene glycol and combinations thereof. More preferably the particulate dairy composition comprises less than 0.1 wt. %, calculated by dry weight of the agglomerates, of instantizing agents and most preferably the particulate dairy composition comprises no instantizing agents.

The particulate dairy composition of the present invention preferably comprises less than 0.5 wt. %, more preferably less than 0.1 wt. %, calculated by dry weight of the agglomerates, of inorganic phosphates and most preferably the particulate dairy composition comprises no inorganic phosphates.

The particulate dairy composition of the present invention preferably comprises less than 0.5 wt. %, calculated by dry weight of the agglomerates, of buffers selected from citric acid, acetic acid, salts of these acids and combinations thereof. More preferably the particulate dairy composition comprises less than 0.1 wt. %, calculated by dry weight of the agglomerates, of said buffers and most preferably the particulate dairy composition comprises no buffers.

The particulate dairy composition of the present invention preferably comprises less than 0.5 wt. %, more preferably less than 0.1 wt. %, calculated by dry weight of the agglomerates, of instantizing agents, inorganic phosphates and/or buffer. Most preferably, the particulate dairy composition comprises no instantizing agents, inorganic phosphates and/or buffers.

The particulate dairy composition of the present invention has excellent dissolution properties as evidenced by a high extraction rate (see Examples). According to a particularly preferred embodiment, the particulate dairy composition has an extraction rate of at least 75%, more preferably of at least 80% and most preferably of at least 82%. The extraction rate of the composition is determined by:

filling plastic capsules from Bisio Progetti, Italy, New Pod EVO Oxygen Barrier (diameter 37 mm, volume 12.6 ml) with the particulate composition, leaving a headspace in the capsule of 2 mm (9 vol. %)

sealing the capsules with the aluminium cover seal from Bisio Progetti, supplied with the capsules introducing the capsule into a Nespresso® Citiz C111 produced by Magimix brewing the capsules using the espresso dosing volume, according to factory settings (40 ml)

determining the extraction rate using the procedure and equations described in the Examples.

The particulate dairy composition of the present invention is preferably obtainable by the process according of the present invention.

The embodiments, as described herein before, relating to the process of the invention also apply to the particulate dairy composition of the present invention. The embodiments, as described herein before, relating to the particulate dairy composition of the invention, also apply to the process of the present invention.

A third aspect of the invention relates to a sealed capsule comprising the particulate dairy composition, as described herein before.

The capsule of the present invention preferably comprises a capsule body to accommodate the particulate dairy composition and a sealing cover to seal the particulate dairy composition in the capsule body. During preparation in a coffee brewing machine, hot water is injected into the capsule body, and the sealing cover is arranged to be perforated in a predefined pattern by the internal pressure.

More preferably, the capsule body comprises a base (e.g. a circular base), a lateral sidewall extending from the base to form a (circular) capsule aperture opposite to the base, and a lip extending laterally away from the lateral sidewall. The sealing cover is preferably attached to the lip surrounding the capsule aperture.

A typical example of such a capsule body and sealing cover is described in U.S. Pat. No. 6,026,732.

The benefits of the present invention are particularly appreciated in case the inner volume of the capsule is relatively small, e.g. not more than 20 ml. Preferably, the capsule has an inner volume between 5 and 18 ml, more preferably between 10 and 15 ml.

Typically, the capsule of the present invention contains 4-8 grams, more preferably 5-7 grams of the particulate dairy composition.

A fourth aspect of the invention relates to the use of the sealed capsule, as described herein before, for preparing a beverage in a high pressure coffee brewing machine. The high pressure brewing machine typically operates at a pressure of 5-20 bar.

The coffee brewing machine in the use of the present invention, which applies injection of hot pressurized water into a sealed capsule, is typically a standard needle coffee machine, such as the Nespresso® machine. An example of such a standard needle coffee machine is described in U.S. Pat. No. 6,026,732.

The prepared beverage is preferably a hot dairy creamy and/or milky liquid, more preferably the beverage is a hot dairy creamer liquid.

The prepared beverage is preferably mixed with brewed coffee to prepare a hot coffee beverage, such as cappuccino or coffee cortado.

The invention is further illustrated by the following non-limiting examples.

EXAMPLES

Example 1

A pre-emulsion was made at 60° C. in the following way:
19.5 kg sucrose (13.4 wt. %) was dissolved in 65.1 kg (15.7 wt. %) of condensed skim milk. Next, 95.1 kg (29.6 wt. %) of milk cream (40 wt. % fat) was added. Finally, 62.7 kg (41.4 wt. %) of skim milk powder was added.

The pre-emulsion was homogenized at 65° C. and 80/30 bar, after which it was spray dried on a Filtermat dryer (GEA), with an inlet temperature of 140° C., and a nozzle pressure of 88 bar.

The subsequent agglomeration and final drying was done on the mat using a temperature of 50° c.

The powder so obtained had the following composition:
Milk protein 24 wt
Fat 26 wt %
Lactose 30 wt. %
Sucrose 13 wt. %

The powder had a poured bulk density of 536 g/L and a GTVV of 7%.

The powder was filled into plastic capsules from Bisio Progetti, Italy, New Pod EVO Oxygen Barrier, diameter 37 mm, volume 12.6 ml. The headspace left in the capsule after filling was 2 mm (9 vol. %).

The capsules were sealed with aluminium cover seal from Bisio Progetti, supplied with the capsules.

Example 2

The capsule of Example 1 was compared with identical capsules that had been filled with commercially available instant creamer or milk powder, also leaving a headspace of 2 mm (9 volume %) in each capsule.

The products tested are shown in Table 1.

TABLE 1

| Sample | Powder | Grams in capsule |
|---|---|---|
| 1 | Powder of Example 1 | 6.2 |
| A | Espressi ® powder[1] | 5.0 |
| B | Coffee Gold cream[2] | 5.2 |
| C | Regilait ® skim milk powder[3] | 3.5 |
| D | Agglomerated skim milk powder[4] | 5.1 |
| E | Standard skim milk powder[4] | 6.5 |
| F | Standard skim milk powder[4] with 17% sugar | 6.9 |
| G | Instant whole milk powder[4] | 5.0 |
| H | Standard whole milk powder[4] | 5.5 |
| I | Standard whole milk powder[4] with 17% sugar | 6.7 |

[1] Ex K-fee
[2] Ex Coffee productions S.L., Spain
[3] Ex Regilait, France
[4] Ex FrieslandCampina, Netherlands The bulk density and particle size distribution of each of the products is shown in Table 2.

TABLE 2

| Sample | $d_{10}$ (μm) | $d_{50}$ (μm) | $d_{90}$ (μm) | D [3, 2] (μm) | D [4, 3] (μm) | Poured bulk density (g/L) |
|---|---|---|---|---|---|---|
| 1 | 47 | 155 | 380 | 92 | 201 | 536 |
| A | 64 | 154 | 317 | 112 | 182 | 441 |
| B | 41 | 106 | 241 | 71 | 131 | 457 |
| C | 260 | 1470 | 2570 | 606 | 1490 | 305 |
| D | — | — | — | — | — | 447 |
| E | 32 | 92 | 333 | 64 | 162 | 569 |
| F | 36 | 108 | 541 | 74 | 204 | 606 |
| G | 79 | 203 | 556 | 153 | 274 | 438 |
| H | 43 | 136 | 387 | 90 | 184 | 483 |
| I | 47 | 162 | 532 | 102 | 233 | 606 |

The powder extraction rate for each of the capsules was measured using a Nespresso® Citiz C111 produced by Magimix:
1. The capsules were brewed using the espresso dosing volume, according to factory settings (40 ml)
2. The smell, mouthfeel, milky/creamy sensation and overall liking of the liquid brews was evaluated by an expert panel (7 panel members) and scored on a scale of 1 (bad) to 5 (excellent)
3. The liquid brews were collected and weighed for later calculations
4. The gas tight void volume (GTVV) and extraction rate were determined Extraction rate was determined by first measuring the dry matter content of liquid brews using the burned sand method:
  5 g of the liquid brew is dispersed in a beaker containing 25 g of burned sand (Sand, Fontainebleau, VWR chemicals, USA).
The beaker is placed in an oven at 103° C. for 3 hours.
By weighing the beaker the concentration of the brewing can be calculated according to equation below.

$$\text{Dry matter (\%)} = 100\% * \frac{\text{Weight beaker after drying} - \text{Weight of beaker with only sand}}{\text{Weight beaker with liquid} - \text{Weight of beaker with only sand}}$$

The extraction rate is calculated by using the following formula:

$$\text{Extraction rate (\%)} = 100\% * \frac{\text{Weight of brewed liquid (g)} * \text{Dry matter}^1 (\%)}{\text{Weight powder in capsule (g)} \times (100\% - \text{moisture}^2 (\%))}$$

[1] of the brewed liquid
[2] of the powder in the capsule

The results of the panel evaluation are shown in Table 3.

TABLE 3

| Sample | Whiteness | Smell | Mouthfeel | Milky/creamy sensation | Overall liking |
|---|---|---|---|---|---|
| 1 | 3.8 | 4.0 | 4.5 | 4.4 | Milky, creamy, full of taste, long lasting, balanced |
| A | 0.8 | 3.6 | 3.6 | 2.3 | Too sweet, too salty, caramel |

TABLE 3-continued

| Sample | Whiteness | Smell | Mouthfeel | Milky/creamy sensation | Overall liking |
|---|---|---|---|---|---|
| B | 4.2 | 2.7 | 2.5 | 3.0 | Off-taste |
| C | 3.7 | 3.2 | 2.8 | 2.7 | Milky, off-taste |
| D | 3.4 | 2.4 | 2.7 | 2.7 | Off-taste |
| E | 3.8 | 1.8 | 2.0 | 1.3 | Watery |
| F | 3.5 | 3.2 | 1.7 | 2.0 | Watery, off-taste |
| G | 3.2 | 3.2 | 2.8 | 3.4 | Milky, watery |
| H | 3.6 | 2.5 | 1.3 | 1.7 | Watery |
| I | 3.5 | 2.0 | 3.0 | 3.1 | Milky, off-taste |

The extraction rates and GTVV's for the capsules are summarised in Table 4.

TABLE 4

| Sample | Extraction rate (%) | GTVV (%) |
|---|---|---|
| 1 | 87 | 7.1 |
| A | 87 | 19.3 |
| B | 66 | 12.8 |
| C | 94 | n.d. |
| D | 41 | 15.7 |
| E | 36 | 19.3 |
| F | 46 | n.d. |
| G | 82 | 9.3 |
| H | 40 | 14.8 |
| I | 39 | n.d. | n.d. = not determined

Example 3

Example 2 was repeated, except that this time the liquid brews were used to prepare coffee cortado. This was done by first producing 40 ml of the liquid brews using the capsule containing the instant creamer or milk powder, and subsequently adding 40 ml of espresso that had been brewed in the same brewing machine using an espresso coffee capsule (l'Or Espresso Forza, ex Douwe Egberts, the Netherlands).

Several sensory attributes of the coffee cortado's so produced were evaluated by an expert panel (7 panel members). These attributes were scored on a scale of 0 to 5. The results are shown in Table 5.

TABLE 5

| Sample | Whiteness | Smell | Mouthfeel | Sweetness | Milky/creamy sensation | Coffee taste | Overall taste |
|---|---|---|---|---|---|---|---|
| 1 | 4.6 | 3.8 | 4.3 | 2.8 | 3.9 | 2.6 | 4.4 |
| A | 3.4 | 3.1 | 3.5 | 4.5 | 3.3 | 2.3 | 3.1 |
| B | 2.4 | 2.1 | 2.4 | 0.5 | 2.0 | 3.3 | 2.1 |
| C | 2.1 | 1.9 | 2.5 | 0.8 | 2.1 | 3.1 | 2.3 |
| D | 2.7 | 2.5 | 3.1 | 0.5 | 2.5 | 2.8 | 2.3 |
| E | 1.1 | 1.5 | 2.0 | 0.1 | 0.6 | 3.6 | 1.3 |
| F | 1.8 | 2.5 | 1.6 | 1.6 | 2.0 | 3.4 | 2.1 |
| G | 4.4 | 3.6 | 3.3 | 0.9 | 2.8 | 2.6 | 3.1 |
| H | 2.3 | 2.6 | 1.6 | 0.4 | 1.0 | 3.1 | 1.6 |
| I | 1.4 | 1.6 | 2.3 | 3.0 | 2.4 | 3.1 | 2.2 |

Example 4

A spray-dried creamer composition was prepared as described in Example 1 of WO 2016/008742.

Whole milk, dairy cream and sugar were mixed to provide an emulsion having the composition shown in Table 6.

TABLE 6

| | Wt. % |
|---|---|
| Whole milk | 71.8 |
| Cream (% fat) | 7.6 |
| Sugar (sucrose) | 20.6 |

The emulsion was spray dried using the following procedure: A wet mix was prepared by mixing 597 kg whole milk and 20.6 kg sugar. Then, 16.9 kg of cream (40% fat) was added; The mix was UHT treated at 102° C. for 5 seconds (DSI-type pasteurization, at 18% solids); Evaporation until 53% DM (53-55%); Homogenisation 200 bar;
Spray drying, at moderate and mild pressure and temperatures (160° C.).

The composition of the spray dried powder so obtained is shown in Table 7.

TABLE 7

| | Wt. % |
|---|---|
| Protein | 19.5 |
| Fat | 26.3 |
| Sugar (sucrose) | 20.0 |
| Moisture | 3.0 |

The bulk density, particle size distribution and GTVV of the spray dried powder is shown in Table 8.

TABLE 8

| $d_{10}$ (μm) | $d_{50}$ (μm) | $d_{90}$ (μm) | D [3, 2] (μm) | D [4, 3] (μm) | Poured bulk density (g/L) | GTVV (%) |
|---|---|---|---|---|---|---|
| 35 | 73 | 142 | 60 | 82 | 420 | 10.0 |

5.9 grams of the powder was filled into plastic capsules from Bisio Progetti, Italy, New Pod EVO Oxygen Barrier, diameter 37 mm, volume 12.6 ml, leaving a headspace of 2 mm (9 volume %) in each capsule. The capsules were sealed with aluminium cover seal from Bisio Progetti, supplied with the capsules.

The powder extraction rate was measured in the same way as in Example 2. The measured extraction rate was 74.8%.

Example 5

Example 1 was repeated, except that this time only half the amount of sucrose was added to the pre-emulsion and that the water content was slightly reduced to achieve the same dry matter content. Sucrose was separately added to the agglomerated powder after the final drying step to produce a dry mix having the same composition as the agglomerated powder of Example 1.

The particle size distribution of the agglomerated spray dried powder is shown in Table 9.

TABLE 9

| $d_{10}$ (μm) | $d_{50}$ (μm) | $d_{90}$ (μm) | D [3,2] (μm) | D [4,3] (μm) |
|---|---|---|---|---|
| 58 | 166 | 415 | 116 | 211 |

The blend of the agglomerated spray dried powder and sucrose had a poured bulk density of 436 g/L and a GTVV of 8.4%.

6.2 grams of the powder blend was filled into plastic capsules from Bisio Progetti, Italy, New Pod EVO Oxygen Barrier, diameter 37 mm, volume 12.6 ml, leaving a headspace of 2 mm (9 volume %) in each capsule. The capsules were sealed with aluminium cover seal from Bisio Progetti, supplied with the capsules.

The powder extraction rate was measured in the same way as in Example 2. The measured extraction rate was 80.5%.

Example 6

Example 1 was repeated, except that amounts of sucrose, condensed skim milk, milk cream (40 wt. % fat) and skim milk powder were adjusted to produce pre-emulsions having the compositions shown in Table 10.

TABLE 10

| | Pre-emulsion 1 (wt. %) | Pre-emulsion 2 (wt. %) |
|---|---|---|
| Sucrose | 19.8 | 9.1 |
| Condensed milk | 38.5 | 41.7 |
| Milk cream | 24.3 | 18.7 |
| Skim milk powder | 8.4 | 9.9 |
| Milk protein concentrate MPC80) | 9 | |
| Lactose | | 20.6 |

The particle size distributions of the agglomerated spray dried powders so obtained are shown in Table 11.

TABLE 11

| Agglomerated powder | $d_{10}$ (μm) | $d_{50}$ (μm) | $d_{90}$ (μm) | D [3,2] (μm) | D [4,3] (μm) |
|---|---|---|---|---|---|
| 1 | 68 | 216 | 525 | 139 | 266 |
| 2 | 85 | 273 | 739 | 174 | 367 |

The compositions, poured bulk density and GTVV of the blends of spray dried powder and post-added sucrose is shown in Table 12.

TABLE 12

| | Blend 1 (wt. %) | Blend 2 (wt. %) |
|---|---|---|
| Protein | 19.1 | 17.3 |
| Fat | 18.1 | 14.3 |

TABLE 12-continued

| | Blend 1 (wt. %) | Blend 2 (wt. %) |
|---|---|---|
| Sugar | 28.3 | 21.0 |
| Moisture | 2.5 | 3.5 |
| Poured bulk density | 416 g/L | 484 g/L |
| GTVV | 8.3% | 8.4% |

6.2 grams of the powder blends was filled into plastic capsules from Bisio Progetti, Italy, New Pod EVO Oxygen Barrier, diameter 37 mm, volume 12.6 ml, leaving a headspace of 2 mm (9 volume %) in each capsule. The capsules were sealed with aluminium cover seal from Bisio Progetti, supplied with the capsules.

The powder extraction rates was measured in the same way as in Example 2. The measured extraction rate were as follows:
Blend 1: 85.5%
Blend 2: 87.0%

The invention claimed is:

1. A process for preparing a particulate dairy composition, wherein the process comprises:
   (a) combining condensed skimmed milk, sucrose, milk cream and milk powder to prepare a pre-emulsion comprising 46-66 wt. % dry matter comprising, by weight of dry matter:
      (i) 15-29 wt. % milk protein;
      (ii) 8-33 wt. % milk fat;
      (iii) 18-47 wt. % lactose; and
      (iv) 7-18 wt. % sucrose;
   (b) homogenizing the pre-emulsion at a temperature between 55-70° C. and at a pressure between 5-120 bar to obtain an emulsion;
   (c) spray drying the emulsion to produce a semi-dried powder having a water content of at least 5 wt. %; and
   (d) further drying the semi-dried powder to produce agglomerates having a water content of less than 5 wt. %.

2. The process according to claim 1, wherein the pre-emulsion is prepared by:
   (I) mixing the condensed skimmed milk with the sucrose to obtain a mixture A;
   (II) mixing the mixture A with the milk cream to obtain a mixture B;
   (III) mixing the mixture B with the milk powder to obtain the pre-emulsion.

3. The process according to claim 1, wherein the pre-emulsion is prepared by combining:
   (I) 7-44 parts by weight condensed skimmed milk;
   (II) 5-15 parts by weight sucrose;
   (III) 10-57 parts by weight milk powder;
   (IV) 10-40 parts by weight milk cream.

4. The process according to claim 1, wherein the pre-emulsion comprises 48-64 wt. % dry matter.

5. The process according to claim 1, wherein the spray-drying is performed using a nozzle pressure of 80-120 bar.

6. The process according to claim 1, wherein the agglomerates have a D[3,2] mean diameter of 50-250 μm.

7. The process according to claim 1, further comprising (e) mixing 77.5-99 parts by weight of the agglomerates with 1-22.5 parts by weight of sucrose particles.

* * * * *